3,061,574
Patented Oct. 30, 1962

3,061,574
PROCESS FOR THE PREPARATION OF POLYURETHANE ELASTOMERS
John Frederick Smith, Brandywine Hundred, Del., assignor to E. I. du Pont de Nemours and Company, Wilmington, Del., a corporation of Delaware
No Drawing. Filed Mar. 20, 1958, Ser. No. 722,629
5 Claims. (Cl. 260—37)

This invention relates to a novel liquid composition and more particularly to a process for preparing a sulfur cured polyurethane elastomer from this liquid composition.

Polyurethane elastomers are valuable and highly useful materials in that they exhibit superior abrasion resistance as compared with other elastomers. Heretofore, these polyurethane elastomers have been prepared by reacting a polymeric glycol with an organic diisocyanate, with or without a subsequent chain extension step, to form linear soluble thermoplastic polymers which have then been cured by a process which comprises compounding them on a rubber roll mill with the appropriate compounding and curing agents and subsequently heating the compounded stock in a mold. The curing agents are selected on the basis of the curing or cross-linking sites which are present on the polyurethane material. In compounding the polyurethane slab stock extremely high energy equipment is required in view of the toughness of the stock. It would be highly desirable, therefore, to be able to provide a process for the preparation of a cured polyurethane elastomer which process does not involve the use of high energy compounding equipment.

It is an object of the present invention to provide a novel liquid composition. A further object is to provide a liquid composition which can be converted to a cured, cross-linked, polyurethane elastomer merely by the application of heat. A still further object is to provide a liquid composition which can be compounded with conventional compounding ingredients such as carbon black to a greater extent than previously prepared polyurethane materials and which can be subsequently cured to form highly useful polyurethane elastomers. Other objects will appear hereinafter.

These and other objects of this invention are accomplished by a fluid composition which is curable to form a polyurethane elastomer comprising (1) X moles of a glycol having a side chain bearing a terminal —CH=CH$_2$ group, (2) 0.1X to 1.0X mole of 2,2'-dithiobisbenzothiazole, (3) 0X to 1.0X mole of 2-mercaptobenzothiazole, (4) 0.2X to 5.0X moles of sulfur, (5) Y moles of a glycol having a molecular weight not greater than 3500, said glycol being selected from the group consisting of alkylene glycols, alkyleneether glycols, alkyleneether-thioether glycols, polyalkyleneether glycols, polyalkyene-arylene-ether glycols, polyalkyleneether-thioether glycols and polyalkylene-aryleneether-thioether glycols, (6) Z moles of an isocyanate-terminated polyurethane having a molecular weight from about 1070 to 5000 and being selected from the group consisting of polyalkyleneether polyurethanes, polyalkylene-aryleneether polyurethanes, polyalkylene-ether-thioether polyurethanes and polyalkylene-arylene-ether-thioether polyurethanes, said polyurethanes being prepared by reacting a molar excess of an organic diisocyanate with a polymeric glycol having a molecular weight of from about 750 to 3500: with the proviso that X and Z are integers greater than 0 and Y is an integer which may include 0, with Z being about equal to the sum of X and Y; with the further proviso that the mole ratio of sulfur to 2,2'-dithiobisbenzothiazole is at least 1.0 and that X be sufficiently large so as to provide at least one side chain bearing a terminal —CH=CH$_2$ group for every 12,000 molecular weight units of polyurethane elastomer which is obtained from this fluid composition. The above described liquid composition is converted to a sulfur cured polyurethane elastomer merely by the application of heat. The hydroxyl groups of the glycol components of said composition react with the isocyanate terminated polyurethane to produce a chain-extended polyurethane polymer and at the same time cross-linking occurs by sulfur curing utilizing the side chain terminal unsaturated groups in the presence of the vulcanization accelerators. As much as 200 parts by weight of conventional compounding ingredients such as carbon black may be compounded with each 100 parts by weight of these liquid compositions; the compounded stocks when cured produce a polyurethane elastomer having outstanding properties.

The glycols having side chains bearing a terminal —CH=CH$_2$ group which are used in preparing the liquid compositions of this invention may be entirely aliphatic or may containing aromatic or cycloaliphatic constituents. Representative glycols include 4-methyl-3-cyclohexene-1,1-dimethanol, 3-cyclohexene-1,1dimethanol, 3-allyloxy-1,5-pentanediol, 3-(allyloxy)-1,2-propanediol, 2-[(allyloxy)-methyl] - 2 - methyl - 1,3 - propanediol, 2 - vinyl-1,3-propanediol, 3-(methylallyloxy)-1,2-propanediol, 2,2'-(4-allyl-m-phenylenedioxy)diethanol, 3-(o-allylphenoxy)-1,2-propanediol, 2[(allyloxy)ethyl]-1,3-propanediol, 2-methyl - 2 - [(4 - pentenyloxy)methyl] - 1,3 - propanediol, 2-[(allyloxy)ethyl]-2-methyl-1,3-propanediol, 2-methyl - 2[(10 - undecenyloxy) - methyl] - 1,3 - propanediol, 2,2'-(allylimino)-diethanol, 2[(3-methallyloxy)-methyl]-2-methyl-1,3-propanediol 2-[(allyloxy)methyl]-1,3-propanediol, 3-(o-propenylphenoxy)-1,2-propanediol, and 3-(p-propenylphenoxy)-1,2-propanediol. The 1,3-propanediols of the formula

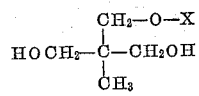

wherein X is a hydrocarbon radical bearing a terminal aliphatic —CH=CH$_2$ group, are preferred. The side chains bearing terminal —CH=CH$_2$ groups may be present on polymeric glycols such as a polytetramethyleneether glycol. Such a compound, containing a plurality of side chains, may be prepared by copolymerizing butadiene monooxide with tetrahydrofuran.

The amount of glycol having side chain unsaturation which is used should provide at least one of these side chain unsaturated groups as a crosslink site for every 12,000 molecular weight units of the resulting polyurethane elastomer. If less of these cure sites are provided, the modulus and tensile strength of the cured elastomer will be lower than preferred, particularly when carbon black has been used as a compounding ingredient. It is generally not necessary that there be more than about one unsaturated side chain group for every 2500 molecular weight units of elastomer. If there are more unsaturated side chains and if sufficient sulfur is present to react with all of them, the cured elastomer will tend to exhibit a high modulus with short extension at the break which is characteristic of an overcure. On the other hand, if insufficient sulfur is supplied to react with all the excess unsaturated side chains so that only about one crosslink can be formed for each 2500 molecular weight units of elastomer, the product will have satisfactory stress-strain characteristics. There is usually no advantage in supplying more side chain unsaturated groups than are needed.

The isocyanate-terminated polyurethanes which are present as a component in the fluid compositions are obtained by reacting a molar excess of an organic diisocyanate with a polymeric glycol having a molecular weight of from about 750 to 3500. This reaction may be carried out in one or more steps. In the latter case a hydroxyl terminated polyurethane may first be prepared and this then converted to an isocyanate-terminated polyurethane by reaction with additional diisocyanate. It is to be understood that mixtures of two or more polymeric glycols and two or more diisocyanates may be employed in the preparation of these isocyanate-terminated polyurethanes. In preparing these polyurethanes by a one-step process, a reaction temperature of about 100° C. for from one to two hours should be employed to achieve complete reaction. These polyurethanes should have a molecular weight of from about 1070 to 5000, in order that the curable composition remain fluid prior to casting and molding. By the term "fluid" or "liquid" as used throughout the present specification and claims is meant a composition which is pourable or easily extrudable without the use of excessive mechanical force.

Any of a wide variety of organic diisocyanates may be employed to prepare the isocyanate-terminated polyurethanes. Aromatic, aliphatic and cycloaliphatic diisocyanates and combinations of these types are useful. Representative compounds include toluene-2,4-diisocyanate, 1,5-naphthalene diisocyanate, cumene-2,4-diisocyanate, 4-methoxy-1,3-phenylenediisocyanate, 4-chloro-1,3-phenylenediisocyanate, 4-ethoxy-1,3-phenylenediisocyanate, 2,4′ - diisocyanatodiphenylether, benzidinediisocyanate, nitro benzidene diisocyanate, 4,4′-diisocyanatodibenzyl, 3,3′-dimethyl-4,4′-diisocyanatodiphenylmethane, 3,3′ - dimethyl - 4,4′ - diisocyanatodiphenyl, 1,4 - tetramethylene diisocyanate, 1,6-hexamethylene diisocyanate, 1,10-decamethylene diisocyanate, 1,4-cyclohexylene diisocyanate, 4,4′ - methylene - bis(cyclohexyl isocyanate) and 1,5-tetrahydronaphthalene diisocyanate. Arylene diisocyanates, i.e., those in which each of the two isocyanate groups is attached directly to an aromatic ring, are preferred. Compounds such as toluene-2,4-diisocyanate in which the two isocyanate groups differ in reactivity are particularly desirable.

The polymeric glycols which may be used to prepare the isocyanate-terminated polyurethanes include the polyalkyleneether glycols, polyalkyleneether-thioether glycols, the polyalkylene-aryleneether glycols and the polyalkylene-aryleneether-thioether glycols. The polyalkyleneether glycols may be represented by the formula $$HO(RO)_aH$$

wherein R is an alkylene radical containing up to 10 carbon atoms and $a$ is an integer sufficiently large so that the molecular weight of the polymeric glycol is about 750 to 3500. Not all of the alkylene radicals need be the same. These compounds are usually made by the polymerization of cyclic ethers such as alkylene oxides or dioxane or by the condensation of glycols. Representative examples of these polymeric glycols are poly - 1,2 - propyleneether glycol, 1,2 - polydimethylethyleneether glycol, ethylene oxide-modified poly-1,2-propyleneether glycol, polytetramethyleneether glycol (also known as poly n-butyleneether glycol), polypentamethyleneether glycol, polytetramethyleneformal glycol, and polydecamethyleneether glycol. Polytetramethyleneether glycol is preferred.

The polyalkyleneether-thioether glycols may be represented by the formula $HO(QY)_aH$ wherein Q represents hydrocarbon radicals at least some of which are alkylene, Y represents chalcogen atoms some of which are sulfur and the rest oxygen, and $a$ is an integer sufficiently large so that the molecular weight of the polymer is about 750 to 3500. The following are representative examples:

HO(CH$_2$—CH$_2$—S—CH$_2$—CH$_2$
　　　　　　　　　—O—CH$_2$—CH$_2$—O—)$_a$H

HO(CH$_2$—CH$_2$—S—CH$_2$—CH$_2$—O—)$_a$H
and

HO(CH$_2$CH$_2$—S—CH$_2$CH$_2$CH$_2$CH$_2$
　　　　　　　　　—S—CH$_2$CH$_2$—O—)$_a$H

These glycols may be prepared by condensing together various glycols and thiodiglycol in the presence of a catalyst such as p-toluene sulfonic acid.

The polyalkylene-arylene glycols are similar to the polyalkyleneether glycols except that some arylene radicals are present. The phenylene, naphthalene and anthracene radicals may be used with or without substituents such as alkyl or alkylene groups, and, in general, there should be at least one alkyleneether radical having a molecular weight of about 500 for each arylene radical which is present. When part of the ether oxygens are replaced with sulfur, a polyalkylene-arylene-ether-thioether glycol results, which also may be used in the subject composition.

In addition to the glycol containing an unsaturated side chain group and the isocyanate-terminated polyurethane, the present fluid compositions may contain another glycol which can be used for chain extension of the isocyanate-terminated polyurethane. This glycol should contain no groups other than the two hydroxyl groups which are reactive with isocyanate groups and in order that the resulting curable composition will still be fluid this glycol should have a molecular weight of not greater than about 3500.

Representative glycols include: alkylene glycols such as ethylene glycol, propylene glycol, trimethylene glycol, 1,2-butylene glycol, 1,4-butanediol, 1,5-pentanediol, 1,2-hexylene glycol, 1,10-dicanediol; alkyleneether glycols such as diethylene glycol, 2-hydroxyethoxy-1-propanol, 4-(2-hydroxyethoxy)-1-butanol, 5-(2-hydroxyethoxy)-1-pentanol, 3-(2-hydroxypropoxy)-1-propanol, and 5-(2-hydroxypropoxy)-1-pentanol; an alkylene thioether glycol such as thiodiglycol; an alkyleneether thioether glycol such as 2,2′-[thiobis(ethyleneoxy)]diethanol; and the polyalkyleneether glycols, polyalkyleneether-thioether glycols, polyalkylene-aryleneether glycols and polyalkylene-aryleneether-thioether glycols.

As mentioned above, the amount of isocyanate-terminated polyurethane to be used should be sufficient so as to provide a number of isocyanate groups substantially equal to the number of hydroxyl groups present on the glycol components. It has been determined that if this ratio is substantially less than or greater than 1.0 the chain extension will be incomplete and the tensile strength of the resulting cured elastomer will be lower. It is to be understood that when carbon black, which often contains water and sites which are reactive with isocyanate groups, is used as a compounding ingredient the ratio of the number of isocyanate groups to the number of hydroxyl groups in the glycols may be greater than one, for example, it may be as high as 1.25, in order to compensate for the isocyanate reaction with the carbon black.

As has been discussed above, chain extension of the fluid composition with the formation of urethane groups occurs and, as this chain extension takes place, the mixture will become steadily more viscous until it eventually becomes a soft solid. In general the pot life of this liquid composition is about 24 hours. As chain extension is taking place, cross-linking is also being accomplished by reaction of sulfur with the unsaturated side chain groups. Accordingly the composition should contain from about 0.2 to 5.0 moles of sulfur for every mole of glycol having an unsaturated side chain group. It has been determined that when less than this amount of sulfur is used the resulting elastomer is under-cured. The preferred sulfur content is about 0.5 to 2.5 moles per mole of unsaturated glycol. It has been pointed out above that when more than one unsaturated side chain is provided prior to cure for every 2500 molecular weight units of product elastomer it is preferred not to react every one of these chains with sulfur. About 0.5 mole of sulfur is then used for every 2500 molecular weight units of product elastomer. In addition to the sulfur, the composition should contain from about 0.1 to 1.0 mole per mole of unsaturated glycol of 2,2'-dithiobisbenzothiazole which acts as a vulcanization or curing accelerator. In order to provide an elastomer which is adequately cured, the molar ratio of sulfur to 2,2'-dithiobisbenzothiazole should be at least 1.0. In addition to the 2,2'-dithiobisbenzothiazole another vulcanization accelerator, namely 2-mercaptobenzothiazole, may be used in an amount of up to about 1.0 mole per mole of unsaturated glycol. The 2-mercaptobenzothiazole may be omitted entirely if the unsaturated glycol is reacted with the sulfur curing agent prior to the time that the isocyanate-terminated polyurethane is introduced into the composition for chain extension. If any of the unsaturated glycols present have, on the average, more than one —CH=CH$_2$ terminated side chain per glycol molecule, the moles of sulfur, 2,2'-dithiobisbenzothiazole, and 2-mercaptobenzothiazole used will be based on the number of molar equivalents of —CH=CH$_2$ groups rather than on the number of moles of unsaturated glycol. All of these curing agents may be easily dispersed in the fluid composition by conventional mechanical agitation.

In addition to the above, other vulcanization accelerators may be used such as a 1:1 molar zinc chloride:2,2'-dithiobisbenzothiazole complex or a 1:1 molar zinc chloride:2-mercaptobenzothiazole complex or, in combination, equimolar amounts of the cadmium salt of 2-mercaptobenzothiazole and quinolinium tetrachlorozincate. Also compounding ingredients such as carbon black may be incorporated into the fluid composition prior to the heating of said composition to cure the same. Dispersion of the carbon black may best be accomplished by using a 3-roll mill of the type known in the trade as an ink mill and it is possible to incorporate from about a few percent to as high as several hundred percent by weight of carbon black.

There are distinct advantages in being able to load the liquid composition of this invention with more carbon black than is possible with polyurethane elastomers prepared by conventional means. Polyurethane elastomers are expensive. Black loading lowers the price per pound; thus more highly loaded polyurethane elastomers can sell at a more competitive price and find broader commercial acceptance. The stiffness of conventional uncured uncrosslinked polyurethane gum stocks precludes compounding with much above 40 to 50 parts by weight of carbon black per 100 parts by weight of polyurethane. 200 parts by weight of carbon black can easily be incorporated into the subject fluid mixture to give a hard rubbery polymer after chain extension and cure.

After the fluid composition is prepared, it can be molded in conventional equipment. It is introduced into a mold which is subsequently sealed and heated until the chain extended cross-linked cured elastomer has formed. The fluid composition can also be cast in open molds if it is first degassed (generally by heating to about 100° C., preferably under reduced pressure). The time needed for forming the cured elastomer will vary inversely with the mold temperature and directly with the activity of the curing agents and the rate of urethane formation. Generally, about 1 to 3 hours at 140° C. is enough. Temperatures between about 130° to 170° C. are suitable; 140° to 150° C. is preferred. Below 130° C. the sulfur curing proceeds too slowly. Above 170° C. there is a tendency toward degradation of the polymer chains. The chain extension can be accelerated by the addition of a few hundredths percent by weight of ferric acetonyl acetonate but the vastly shortened pot life of the fluid composition makes the casting operation less convenient to operate when the catalyst is used.

When the fluid composition is heated, cross-linking by sulfur curing occurs at the same time as chain extension. It is possible to carry out sulfur curing by first heating the unsaturated glycol component with the sulfur curing agents alone or, preferably, in the presence of all the fluid composition components except the isocyanate-terminated polyurethanes. The reaction proceeds to completion in about one to four hours at 140° C. Temperatures ranging from about 100° to 250° C. are satisfactory. The reaction proceeds much too slowly below 100° C.; thermal degradation is risked above 250° C. After the unsaturated glycol component, and if desired the other glycol component, has been mixed with the sulfur curing agents, the resulting viscous reaction product may be mixed with the remaining components of the fluid composition, that is, the isocyanate-terminated polyurethane. Carbon black may then be introduced at this time and the mixture obtained cast in a mold and heated at about 100–170° C. until chain extension is complete and an elastomer is formed.

The following examples will more particularly illustrate the present invention, however the invention is not intended to be limited to these examples. Parts are by weight unless otherwise indicated.

PREPARATION OF PREPOLYMER A 278.7 parts of toluene-2,4-diisocyanate and 1000 parts of anhydrous polytetramethyleneether glycol having a molecular weight 1000 are agitated at 80° C. for 4 hours in a dry reaction vessel protected from atmospheric moisture. Prepolymer A thus obtained has a free isocyanate content of 4.2% and a Brookfield viscosity at 30° C. of about 16,500 c.p.s.

PREPARATION OF THE CADMIUM SALT OF 2-MERCAPTOBENZOTHIAZOLE

A solution consisting of 18.33 parts of cadmium chloride, 30 parts of sodium acetate, and 100 parts of water is added slowly to a solution consisting of 33.4 parts of the sodium salt of 2-mercaptobenzothiazole, 40 parts of sodium acetate, and 710 parts of ethanol. The mixture obtained is stirred at room temperature for about 2.5 hours. The precipitated cadmium salt of 2-mercaptobenzothiazole is collected by filtration, washed with ethanol and ether, and dried.

*Test procedure.*—The tensile strength, elongation at break and modulus at 300% extension are determined in accordance with ASTM procedure D412–51T.

Example 1

A. A curing agent (1–A) is made by mixing 10 parts of sulfur, 40 parts of 2,2'-dithiobisbenzothiazole, 20 parts of 2-mercaptobenzothiazole, 7 parts of a 1:1 molar complex of zinc chloride:2,2'-dithiobisbenzothiazole, and 10 parts of cadmium stearate.

B. A fluid composition is prepared by blending 11.5 parts of 2[(allyloxy)methyl]-2-methyl-1,3-propanediol, 72 parts of a polytetramethyleneether glycol having a molecular weight of 1000, 320 parts of Prepolymer A and 22 parts of curing agent (1–A). It is degassed by heating under vacuum at 100° C. and poured into a mold which is subsequently sealed and heated at 140° C. for 2 hours. The cured elastomer obtained has the following properties at 25° C.:

Tensile strength _____ p.s.i__ 1475
Elongation at break _____ percent__ 555
Modulus at 300% extension _____ p.s.i__ 315

Example 2

A. A curing agent (2–A) is made by mixing 40 parts of 2,2'-dithiobisbenzothiazole, 20 parts of 2-mercaptobenzothiazole, 10 parts of sulfur, 3 parts of quinolinium tetrachlorozincate, and 7 parts of the cadmium salt of 2-mercaptobenzothiazole.

B. A fluid composition is prepared by blending on an ink mill 7.0 parts of 2[(allyloxy)methyl]-2-methyl-1,3-propanediol, 106 parts of Prepolymer A, 33 parts of high abrasion furnace black and 7.5 parts of the curing agent (2–A). It is degassed and cast in a mold which is then sealed and heated at 140° C. for 2 hours. The cured polyurethane elastomer obtained has the following properties at 25° C.:

| | |
|---|---|
| Tensile strength p.s.i. | 2000 |
| Elongation at break percent | 410 |
| Modulus at 300% extension p.s.i. | 1350 |

*Example 3*

A. A continually agitated mixture consisting of 13.8 parts of 2[(allyloxy)methyl]-2-methyl-1,3-propanediol, 186.2 parts of polytetramethyleneether glycol having a molecular weight of 1000, 6.4 parts of sulfur, 16.2 parts of 2,2'-dithiobisbenzothiazole, and 3.2 parts of 2-mercaptobenzothiazole is heated to 140° C. An exothermic reaction which occurs at about this temperature necessitates application of water cooling. When the reaction subsides, heat is restored and the mixture is maintained at 140° C. for 2 hours. The polyol composition (3–A) obtained is a viscous syrup at room temperature.

B. 20 parts of the polyol composition prepared above is stirred with 64 parts of Prepolymer A. The mixture thus prepared is degassed and cast in a mold which is subsequently sealed and heated at 140° C. for 60 minutes. Table I contains properties of the polyurethane elastomer vulcanizate (3–B) obtained.

C. 13.5 parts of the polyol composition prepared in A above is mixed on an ink mill with 51 parts of Prepolymer A and 15 parts of high abrasion furnace black. The liquid composition thus prepared is molded by the procedure of Part B. Table I, which follows, contains properties of the polyurethane elastomer (3–C) obtained.

TABLE I.—VULCANIZATE PROPERTIES AT 25° C.

| Sample | (3–B) | (3–C) |
|---|---|---|
| Tensile Strength p.s.i. | 1,190 | 4,000 |
| Elongation at Break percent | 405 | 490 |
| Modulus at 300% Extension p.s.i. | 600 | 1,670 |

This example shows the advantages obtained by carbon black loading.

*Example 4*

A. A mixture consisting of 160 parts of 2-[(allyloxy)-methyl]-2-methyl-1,3-propanediol, 48 parts of 2,2'-dithiobisbenzothiazole, and 16 parts of sulfur is agitated at 140° C. for 2 hours, moderating the initial exothermic reaction as described in Example 3. The polyol composition (4–A) obtained is a soft resin at room temperature.

B. A fluid composition, prepared by mixing 5.6 parts of the polyol composition prepared in A above and 52 parts of Prepolymer A, is degassed and cast in a mold which is then heated at 140° C. for 1 hour. Table II contains some properties of the polyurethane elastomer slab stock (4–B) obtained.

C. A fluid composition is prepared by mixing on an ink mill 6.7 parts of the polyol composition prepared in A above, 84 parts of Prepolymer A, and 27 parts of high abrasion furnace black. It is then molded by the procedure of Part B. Table II contains some properties of the vulcanizate (4–C) obtained.

TABLE II.—VULCANIZATE PROPERTIES AT 25° C.

| Sample | (4–B) | (4–C) |
|---|---|---|
| Tensile Strength p.s.i. | 1,230 | 3,300 |
| Elongation at Break percent | 460 | 400 |
| Modulus at 300% Extension p.s.i. | 400 | 2,200 |

*Example 5*

A. A mixture consisting of 160 parts of 2-[(allyloxy)-methyl]-2-methyl-1,3-propanediol, 90 parts of 1,4-butanediol, 64 parts of sulfur, and 192 parts of 2,2'-dithiobisbenzothiazole is agitated at 140° C. for 2 hours. The product composition is a viscous oil at room temperature.

B. A fluid composition is prepared by mixing on an ink mill 7.6 parts of the oil prepared in A above, 73 parts of Prepolymer A, and 24 parts of high abrasion furnace black. It is degassed and cast in a mold which is subsequently sealed and heated at 140° C. for 1 hour. The polyurethane elastomer obtained has the following properties at 25° C.:

| | |
|---|---|
| Tensile strength p.s.i. | 4200 |
| Elongation at break percent | 455 |
| Modulus at 300% extension p.s.i. | 2600 |

*Example 6*

A. A mixture consisting of 80 parts of 2-[(allyloxy)-methyl]-2-methyl-1,3-propanediol, 1500 parts of polytetramethyleneether glycol having a molecular weight of 3000, 32 parts of sulfur, 83 parts of 2,2'-dithiobisbenzothiazole is agitated at 140° C. for 4 hours. The composition (4–A) obtained is a viscous liquid at room temperature.

B. A fluid composition is prepared by stirring together 34 parts of (4–A) and 45 parts of Prepolymer A is degassed and cast in a mold which is subsequently closed and heated at 140° C. for 1 hour. The polyurethane elastomer obtained has the following properties at 25° C.:

| | |
|---|---|
| Tensile strength p.s.i. | 2530 |
| Elongation at break percent | 610 |
| Modulus at 300% extension p.s.i. | 300 |

*Example 7*

A. *Preparation of polyol mixture.*—1000 parts of polytetramethyleneether glycol having a molecular weight of 1000 and 132 parts of 3-(allyloxy)-1,2-propanediol are agitated together for 2 hours at room temperature to give a polyol mixture (7–A).

B. *Preparation of fluid composition.*—13.2 parts of polyol mixture (7–A), 58.0 parts of Prepolymer A, 0.75 part of sulfur, 0.5 part of 2,2'-dithiobisbenzothiazole, and 0.5 part of 2-mercaptobenzothiazole are mixed together at room temperature to give a fluid composition (7–B).

C. *Preparation of cured polyurethane elastomer.*—Fluid composition (7–B) is heated for about 5 minutes under vacuum at 100°. The degassed mixture is then poured into a mold and heated at 140° C. for 7 hours. The cured vulcanizate obtained has the following properties at 25° C.:

| | |
|---|---|
| Tensile strength p.s.i. | 2325 |
| Elongation at break percent | 500 |
| Modulus at 300% extension p.s.i. | 400 |

It is apparent from the foregoing examples that the present invention provides distinct advantages in the formation of polyurethane elastomers. This invention avoids the use of extremely tough polyurethane slab stocks and it is, therefore, possible to incorporate higher amounts of carbon black. Also, open mold casting is now possible and more efficient cross-linking results from carrying out the sulfur curing procedure in a liquid medium. The fluid compositions of the present invention are useful as a casting rubber in operations requiring high abrasion resistance or in applications where thick sections make the molding and curing of conventionally prepared elastomers difficult. The cured elastomers can, of course, be used in any of the applications known for polyurethane elastomers. Thus, they may be employed in the preparation of tires, inner tubes, belts, hose and tubing, wire and cable jackets, footwear, coated fabrics and a wide variety of coated or molded articles.

As many widely different embodiments of this invention may be made without departing from the spirit and scope thereof, it is to be understood that this invention is not

I claim:
1. Process for the preparation of a sulfur cured polyurethane elastomer which comprises (a) forming a liquid composition by mixing together (1) X moles of a glycol having a side chain bearing a terminal —CH=CH$_2$ group, (2) 0.1X to 1.0X mole of 2,2'-dithiobisbenzothiazole, (3) 0X to 1.0X mole of 2-mercaptobenzothiazole, (4) 0.2X to 5.0X moles of sulfur, (5) Y moles of a glycol having a molecular weight not greater than 3500, said glycol being selected from the group consisting of alkylene glycols, alkyleneether glycols, alkyleneether-thioether glycols, polyalkyleneether glycols, polyalkylene-aryleneether glycols, and polyalkyleneether-thioether glycols and polyalkylene-aryleneether-thioether glycols, (6) Z moles of an isocyanate-terminated polyurethane having a molecular weight from about 1070 to 5000 and being selected from the group consisting of polyalkyleneether polyurethanes, polyalkylene-aryleneether polyurethanes, polyalkyleneether-thioether polyurethanes and polyalkylene-aryleneether-thioether polyurethanes, said polyurethanes being prepared by reacting a molar excess of an organic diisocyanate with a polymeric glycol having a molecular weight of from about 750 to 3500; with the proviso that X and Z are integers greater than 0 and Y is an integer including 0, with Z being about equal to the sum of X and Y; with the further proviso that the mole ratio of sulfur to 2,2'-dithiobisbenzothiazole is at least 1.0 and that X be sufficiently large so as to provide at least one side chain bearing a terminal —CH=CH$_2$ group for every 12,000 molecular weight units of polyurethane elastomer which is obtained from this liquid composition; and (b) heating said mixture to a temperature of from about 130 to 170° C. until a cured elastomer is obtained.

2. The process according to claim 1 wherein up to about 30% by weight of carbon black is introduced into said fluid composition prior to the formation of polyurethane elastomer.

3. The process according to claim 1 wherein the glycol having a side chain bearing a terminal —CH=CH$_2$ group, 2,2'-dithiobisbenzothiazole and sulfur are heated together for about 1 to 4 hours at a temperature of from about 100 to 250° C. prior to the introduction of the isocyanate-terminated polyurethane.

4. The process according to claim 1 wherein 0.03 to 0.2 part by weight of zinc and 0.045 to 0.45 part by weight of cadmium are introduced into each 100 parts by weight of the mixture prior to the formation of the elastomer, said zinc and cadmium being present in the form of a compound selected from the group consisting of halide salts thereof and complexes of said halide salts.

5. The process according to claim 1 wherein the glycol having side chains bearing a terminal —CH=CH$_2$ group is a 1,3-propanediol of the formula

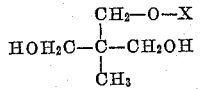

wherein X is a hydrocarbon radical bearing a terminal —CH=CH$_2$ group, the glycol having a molecular weight of not greater than 3500 is a polyalkyleneether glycol, and the isocyanate-terminated polyurethane is prepared by reacting a molar excess of an organic diisocyanate with a polyalkyleneether glycol.

References Cited in the file of this patent
UNITED STATES PATENTS

| | | |
|---|---|---|
| 2,729,618 | Muller et al. | Jan. 3, 1956 |
| 2,741,800 | Brockway | Apr. 17, 1956 |
| 2,808,391 | Patterson | Oct. 1, 1957 |
| 2,846,416 | Arnold et al. | Aug. 5, 1958 |
| 2,921,926 | Kehr | Jan. 19, 1960 |